(12) United States Patent
Eyer et al.

(10) Patent No.: US 10,602,209 B2
(45) Date of Patent: Mar. 24, 2020

(54) TRANSPORT AND ACQUISITION OF DRM-RELATED INFORMATION

(71) Applicant: Sony Corporation, Tokyo (JP)

(72) Inventors: Mark Eyer, Woodinville, WA (US); Tatsuya Igarashi, Tokyo (JP); Brant Candelore, San Diego, CA (US); Paul Hearty, Poway, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/250,582

(22) Filed: Jan. 17, 2019

(65) Prior Publication Data

US 2019/0230393 A1    Jul. 25, 2019

Related U.S. Application Data

(63) Continuation of application No. 15/680,068, filed on Aug. 17, 2017, now Pat. No. 10,237,597.

(51) Int. Cl.
| | |
|---|---|
| *H04N 21/254* | (2011.01) |
| *H04N 21/4627* | (2011.01) |
| *H04N 21/643* | (2011.01) |
| *H04N 21/434* | (2011.01) |

(52) U.S. Cl.
CPC ..... *H04N 21/2541* (2013.01); *H04N 21/4345* (2013.01); *H04N 21/4627* (2013.01); *H04N 21/64322* (2013.01)

(58) Field of Classification Search
CPC combination set(s) only.
See application file for complete search history.

(56) References Cited

U.S. PATENT DOCUMENTS

| | | | |
|---|---|---|---|
| 2007/0294170 A1 | 12/2007 | Vantalon et al. | |
| 2009/0025051 A1* | 1/2009 | Hong | H04N 7/17318 725/114 |
| 2012/0090034 A1* | 4/2012 | Kang | G06F 21/10 726/26 |
| 2015/0222633 A1* | 8/2015 | Smith | H04L 63/10 726/29 |

OTHER PUBLICATIONS

Advanced Television Systems Committee, Inc., "A/52: ATSC Digital Television Standard, Parts 1-6, 2007," Doc. A/53, Part 1: 2007, Jan. 3, 2007, 136 pp.

(Continued)

*Primary Examiner* — Alexander Gee
(74) *Attorney, Agent, or Firm* — Oblon, McClelland, Maier & Neustadt, L.L.P.

(57) ABSTRACT

A reception apparatus includes receiver and processing circuitry. The receiver circuitry is configured to receive a broadcast stream including a service list table (SLT) and a digital rights management (DRM) data service. The SLT includes service information for the DRM data service. The processing circuitry is configured to extract the service information for the DRM data service from the received broadcast stream. The service information for the DRM data service includes a DRM system identifier. The processing circuitry is configured to acquire DRM information from the DRM data service when the DRM system identifier included in the service information for the DRM data service corresponds to a DRM system that is supported by the reception apparatus.

19 Claims, 7 Drawing Sheets

(56) References Cited

OTHER PUBLICATIONS

Advanced Television Systems Committee, Inc., "ATSC Standard: Program and System Information Protocol for Terrestrial Broadcast and Cable," Doc. A65/2013, Aug. 7, 2013, 142 pp.

Advanced Television Systems Committee, Inc., "ATSC Mobile DTV Standard: A/153 Part 3, Service Multiplex and Transport Subsystem Characteristics," Doc. A/153 Part 3:2013, Oct. 29, 2013, 80 pp.

Advanced Television Systems Committee, Inc., "ATSC Standard: A/321, System Discovery and Signaling," Doc. A/321:2016, Mar. 23, 2016, 28 pp.

Advanced Television Systems Committee, Inc., "ATSC Standard: Physical Layer Protocol (A/322)," Doc. A/322:2017, Jun. 6, 2017, 262 pp.

Advanced Television Systems Committee, Inc., "ATSC Proposed Standard: Signaling, Delivery, Synchronization, and Error Protection (A/331)," Doc S33-174r7, May 4, 2017, 201 pp.

Advanced Television Systems Committee, Inc., "ATSC Standard: Service Announcement (A/332)," Doc. A/332-2017, Mar. 16, 2017, 33 pp.

Advanced Television Systems Committee, Inc., "ATSC Standard: Service Usage Reporting (A/333)," Doc. a/333:2017, Jan. 4, 2017, 19 pp.

Advanced Television Systems Committee, Inc., "ATSC Candidate Standard: Application Signaling (A/337)," Doc. S33-215r3, Jul. 12, 2017, 33 pp.

Advanced Television Systems Committee, Inc., "ATSC Candidate Standard: ATSC 3.0 Interactive Content (A/344)," S34-230r4, Aug. 1, 2017, 88 pp.

Paila et al., "FLUTE-File Delivery over Unidirectional Transport," Internet Engineering Task Force, ISSN: 2070-1721, Nov. 2012, 46 pp.

International Telecommunication Union, "Conditional-access systems for digital broadcasting," Recommendation ITU-R BT.1852-1, BT Series, Broadcasting service (television), Oct. 2016, 20 pp.

International Search Report and Written Opinion dated Sep. 10, 2018 in PCT/US18/45916.

* cited by examiner

TRANSPORT AND ACQUISITION OF DRM-RELATED INFORMATION

CROSS-REFERENCE TO RELATED APPLICATIONS

This application is a continuation of U.S. Ser. No. 15/680,068 filed Aug. 17, 2017, the entire content of which is incorporated herein by reference.

TECHNICAL FIELD

The present disclosure relates to methods and apparatuses for the transport and acquisition of digital rights management (DRM) related information.

BACKGROUND

Television broadcasting has evolved from basic analog terrestrial broadcast television to complex digital broadcast television systems. Broadcasting standards currently under development are expected to allow service providers to provide protected as well as unprotected content. However, an efficient signaling and transport mechanism for delivering rights (e.g., DRM-related information) to access the protected content is needed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

According to an embodiment of the present disclosure, there is provided a reception apparatus, including receiver circuitry and processing circuitry. The receiver circuitry is configured to receive a broadcast stream. The processing circuitry is configured to extract a service list table (SLT) from the broadcast stream. The SLT includes service information for each of a plurality of services in the broadcast stream. The processing circuitry is configured to determine whether the broadcast stream includes a digital rights management (DRM) service that is supported by the reception apparatus based on service category information in the service information for the plurality of services in the broadcast stream. Further, the processing circuitry is configured to acquire DRM-related information, which is associated with the reception apparatus and delivered in the DRM service, based on a determination that the broadcast stream includes the DRM service that is supported by the reception apparatus.

According to an embodiment of the present disclosure, there is provided a method of a reception apparatus for acquiring digital rights management (DRM)-related information. The method includes receiving a broadcast stream and extracting a service list table (SLT) from the broadcast stream. The SLT includes service information for each of a plurality of services in the broadcast stream. The method includes determining, by processing circuitry of the reception apparatus, whether the broadcast stream includes a DRM service that is supported by the reception apparatus based on service category information in the service information for the plurality of services in the broadcast stream. Further, the method includes acquiring the DRM-related information, which is associated with the reception apparatus and delivered in the DRM service, based on a determination in the determining that the broadcast stream includes the DRM service that is supported by the reception apparatus.

According to an embodiment of the present disclosure, there is provided a non-transitory computer-readable medium storing instructions, which when executed by a computer, cause the computer to perform a method of a reception apparatus for acquiring digital rights management (DRM)-related information. The method includes receiving a broadcast stream and extracting a service list table (SLT) from the broadcast stream. The SLT includes service information for each of a plurality of services in the broadcast stream. The method includes determining whether the broadcast stream includes a DRM service that is supported by the reception apparatus based on service category information in the service information for the plurality of services in the broadcast stream. Further, the method includes acquiring the DRM-related information, which is associated with the reception apparatus and delivered in the DRM service, based on a determination in the determining that the broadcast stream includes the DRM service that is supported by the reception apparatus.

According to an embodiment of the present disclosure, there is provided a service distribution system including processing circuitry configured to generate a service list table (SLT). The SLT includes service information for each of a plurality of services to be transmitted in a broadcast stream. Each of the service information includes category information for a respective one of the plurality of services. The processing circuitry is configured to generate the broadcast stream including the SLT and the plurality of services for transmission. Further, the processing circuitry is configured to deliver DRM-related information in a DRM service of the plurality of services in the broadcast stream. The service category information included in the SLT for the DRM service identifies it as a DRM Service.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
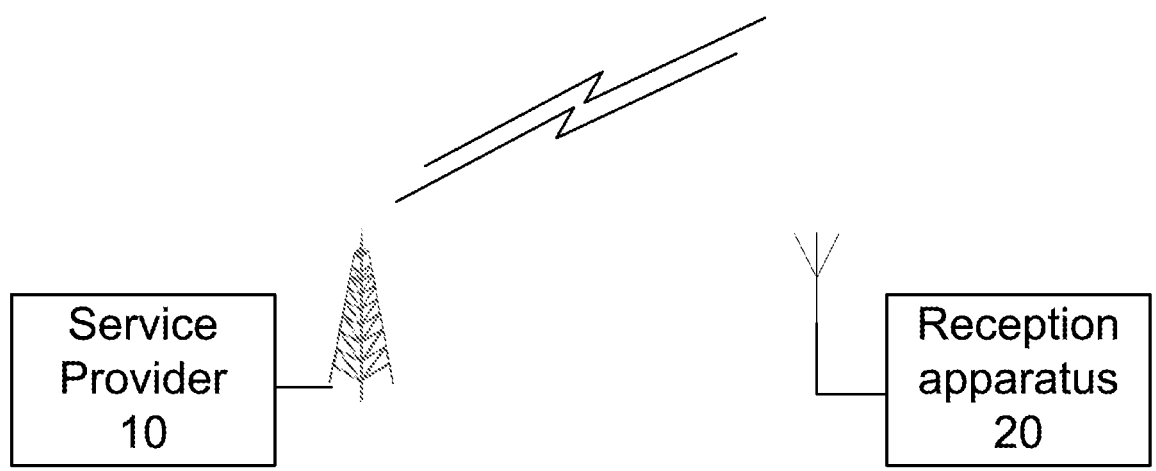
FIG. 1 illustrates an exemplary communication system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described.

Referring now to the drawings, wherein like reference numerals designate identical or corresponding parts throughout several views, the following description relates to the transport and acquisition of DRM-related information. The DRM-related information includes or may include one or a combination of a DRM license, decryption key, and/or other DRM-related files or information. Further, the DRM-related information may include one or a combination of components of an Entitlement Management Message (EMM), as defined for example in ITU-R Recommendation BT.182-1, which is incorporated herein by reference in its entirety. The DRM-related information is used to access rights protected services and/or content delivered in an encrypted format. The rights protected service and/or content may be delivered via a digital television broadcast signal.

The Advanced Television Systems Committee (ATSC) 3.0 digital television system under current standardization in the ATSC uses Internet Protocol (IP) transport mechanisms, rather than an MPEG-2 Transport Stream, and supports rights protected (e.g., encrypted) services. The services may include a collection of media components (e.g., audio and video components of a television program) presented to a user in the aggregate. The components may be of multiple media types, the service may be either continuous or intermittent, the service may be in real-time or non-real-time, and a service in real-time may include a sequence of television programs.

Some services are linear real-time broadcast programming, while others may be "application based," meaning that a user's experience when tuning to that service is determined as a reception apparatus executes a broadcaster-defined downloaded HTML 5 application for example. A service list table (SLT) specifies the characteristics of each service offered by a service provider and indicates to a reception apparatus how and where it can access the components of that service (e.g., audio, video, captions, and/or applications).

In order for the reception apparatus to access an encrypted service, a system for transporting DRM-related information, such as a DRM license and/or any other information needed to decrypt the service, to the reception apparatus is needed. Most reception apparatuses (e.g., digital television receivers) are expected to be capable of being connected to the internet. Service providers can deliver DRM-related information to these connected reception apparatuses via internet based servers. However, not all reception apparatuses may have access to the internet based servers. Thus, a broadcast-only delivery method for this information is needed.

Further, operation of the reception apparatus can be improved if the transport of the DRM-related information within the broadcast stream addresses the following requirements. First, reception apparatuses which do not support DRM (e.g., those which cannot decode and present encrypted services) should not be confused or negatively impacted by the presence of the DRM-related information (e.g., unit-addressed license messages) in a broadcast stream. For example, the DRM-related information could be recognized as DRM-related and not non-real-time (NRT) files a Broadcaster Application (BA) would be interested in, and should be discarded upon reception. Second, a robust and extensible method could be specified to allow top-level filtering of the DRM-related information as it arrives at the reception apparatus. For example, the top-level filtering could allow the reception apparatus to avoid excessive CPU cycles required to filter out the DRM-related information not associated with a supported DRM system, and those not targeted at the reception apparatus (e.g., ones not matching the device or unit ID).

With respect to the first requirement, NRT files that are signaled alongside other components of a service (e.g., the video/audio/caption media segment and initialization segment files) are expected to be downloaded and cached by the reception apparatus in anticipation that they will be needed by a downloaded BA. Thus, a convenient method is needed to allow files containing DRM-related information to be conveniently disregarded by reception apparatuses which are not interested in receiving them. Otherwise, large amounts of application cache storage could be wasted.

The DRM-related information may be used by individual reception apparatus to decrypt a high-value service and/or media, such as pay per view content, one or more subscription services, an enhancement layer for scalable content (e.g., to convert high-definition content to ultra-high definition content), etc. The DRM-related information may be provided if a user of a reception apparatus satisfies some requirement, for example as defined by the broadcaster. A necessary condition may be that he or she fills out a questionnaire, agrees to share history information (e.g., viewing and/or browsing information) and/or demographic information (e.g., gender, age, marital status), or submits payment to a provider of the high-value service and/or media.

FIG. 1 is an exemplary communication system for transport and acquisition of DRM-related information. The communication system includes a service provider 10 and a reception apparatus 20, and corresponds to a digital television broadcast system according to one embodiment.

The service provider (e.g., a broadcaster entity or broadcast station) 10, in one embodiment, is a service distribution system that includes a transmission apparatus with a transmitter that is configured to transmit one or more services in a data stream (e.g., a broadcast stream) to the reception apparatus 20. The transmitter is configured to provide the data stream to the reception apparatus 20, for example via a digital terrestrial broadcast. In other examples, the data stream may be transmitted to the reception apparatus 20 over one or a combination of the digital terrestrial broadcast, a mobile phone network, a broadband network such as the Internet, a cable network, and a satellite link. The service distribution system may use any one or a variety of transmission techniques to communicate the data stream to the reception apparatus 20.

The service distribution system according to one embodiment includes a source encoder, a channel encoder, and a modulator. The source encoder includes data, audio, and video encoders to compress the audio, video, signaling, control or other data received from a source. The channel encoder randomizes, interlaces, channel codes, and frame maps the compressed and signaling data. For example, the channel encoder includes a frame builder that forms many data cells into sequences to be conveyed on Orthogonal frequency-division multiplexing (OFDM)) symbols. The modulator (e.g., a multiplexer) converts the processed digital data into modulation symbols, which can be, for example OFDM symbols (e.g., in the case of the ATSC 3.0 standard currently undergoing standardization). The multiplexed data is then passed to an inverse fast Fourier transformer (IFFT) which transforms a frequency domain signal into a time domain signal. The time domain signal is fed to a guard insertion module for generating a guard interval (GI) between symbols and then to a digital-to-analog (D/A) converter. Then, up-conversion, RF amplification, and over-the air broadcasting are performed to transmit a broadcast stream.

Certain components of the transmission apparatus or the reception apparatus may not be necessary in other embodiments. Details of an OFDM transmitter and receiver may be found, for example, in the DVB-T2 standard (ETSI EN 302 755), ATSC Standard A/322—Physical Layer Protocol (Doc. A/322:2017), and ATSC Standard A/321—System Discovery and Signaling (Doc. A/321:2016) which are incorporated herein by reference in their entirety.

Figure 2:
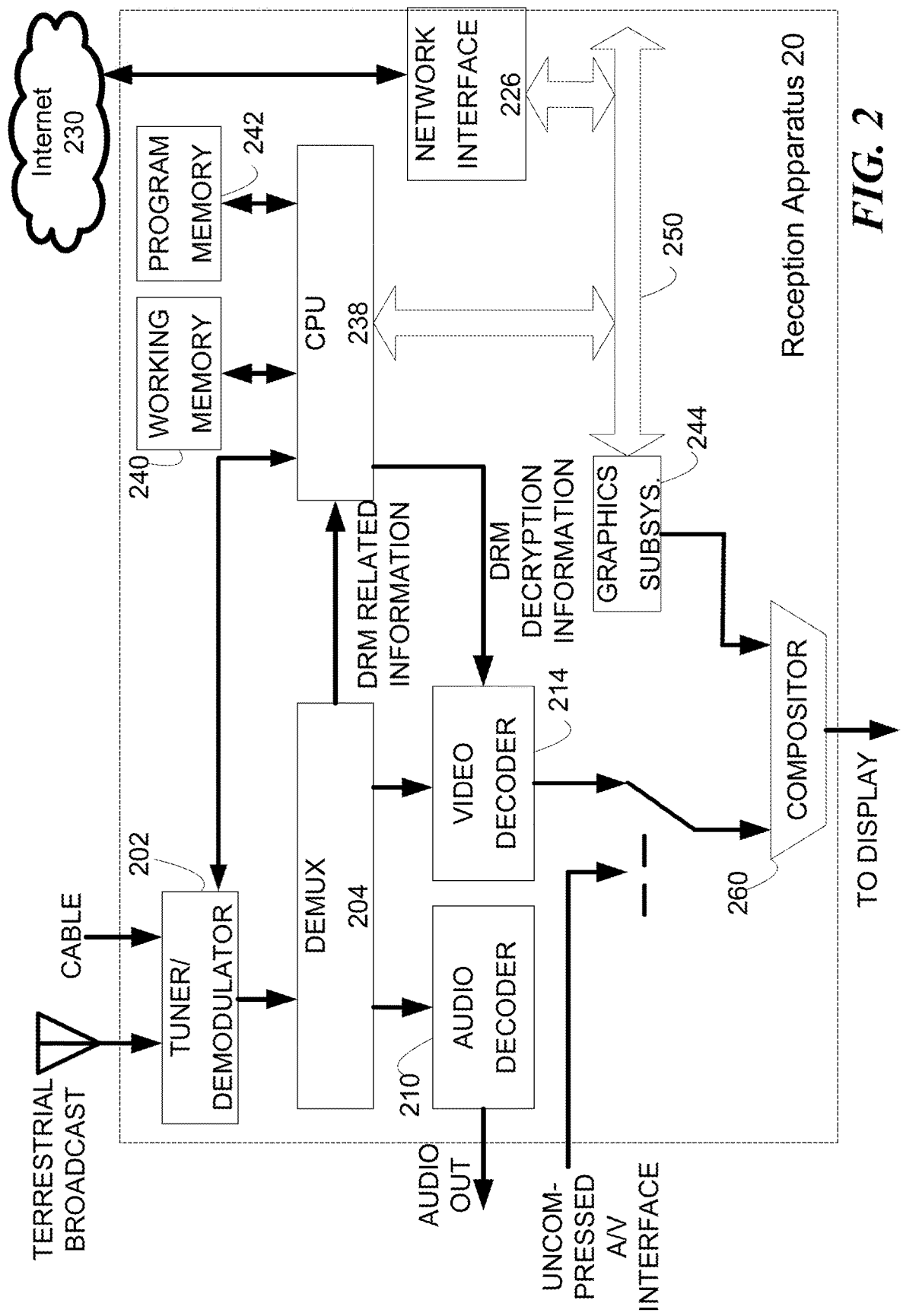
FIG. 2 illustrates an exemplary reception apparatus.

FIG. 2 illustrates an exemplary reception apparatus 20, which is configured to access protected (e.g., encrypted) services or content. The reception apparatus 20 may be a fixed or mobile device such as a television set, a set top box, smartphone, tablet computer, laptop, portable computer, or any other device configured to receive television content. Further, the reception apparatus 20 may be a digital television receiver that is incorporated in a vehicle or any of the fixed or mobile devices described above.

The reception apparatus 20 includes receiver circuitry that is configured to receive a data stream (e.g., a broadcast stream) from one or more service providers 10 and processing circuitry that is configured to perform various functions of the reception apparatus 20. In one embodiment, a tuner/demodulator 202 receives broadcast emissions containing the broadcast stream. Depending on the embodiment, the reception apparatus 20 may alternatively or additionally be configured to receive a cable television transmission or a satellite broadcast. The tuner/demodulator 202 receives the data stream which may be demultiplexed by the demultiplexer 204 or handled by middleware and separated into audio and video (A/V) streams. The audio is decoded by an audio decoder 210 and the video is decoded by a video decoder 214. Further, uncompressed A/V data may be received via an uncompressed A/V interface (e.g., a HDMI interface), if available.

The reception apparatus 20 generally operates under control of at least one processor, such as the CPU 238, which is coupled to a working memory 240, program memory 242, and a graphics subsystem 244 via one or more buses (e.g., bus 250). The CPU 238 receives DRM-related information and signaling information for acquiring the DRM-related information according to one embodiment. The graphics outputted by the graphics subsystem 244 are combined with video images by the compositor and video interface 260 to produce an output suitable for display on a video display.

The CPU 238 operates to carry out functions of the reception apparatus 20 including processing related to presenting protected services or content, and acquisition of the DRM-related information needed for the presentation. Further, the CPU 238 operates to execute script objects (control objects) contained in the application (e.g., HTML5 application), Broadcaster Applications (BA), etc., using for example a browser stored in the program memory 242.

The CPU 238 may be coupled to any one or a combination of the reception apparatus 20 resources to centralize control of one or more functions, in certain embodiments. In one embodiment, the CPU 238 also operates to oversee control of the reception apparatus 20 including the tuner/demodulator 202 and other television resources.

Figure 3:
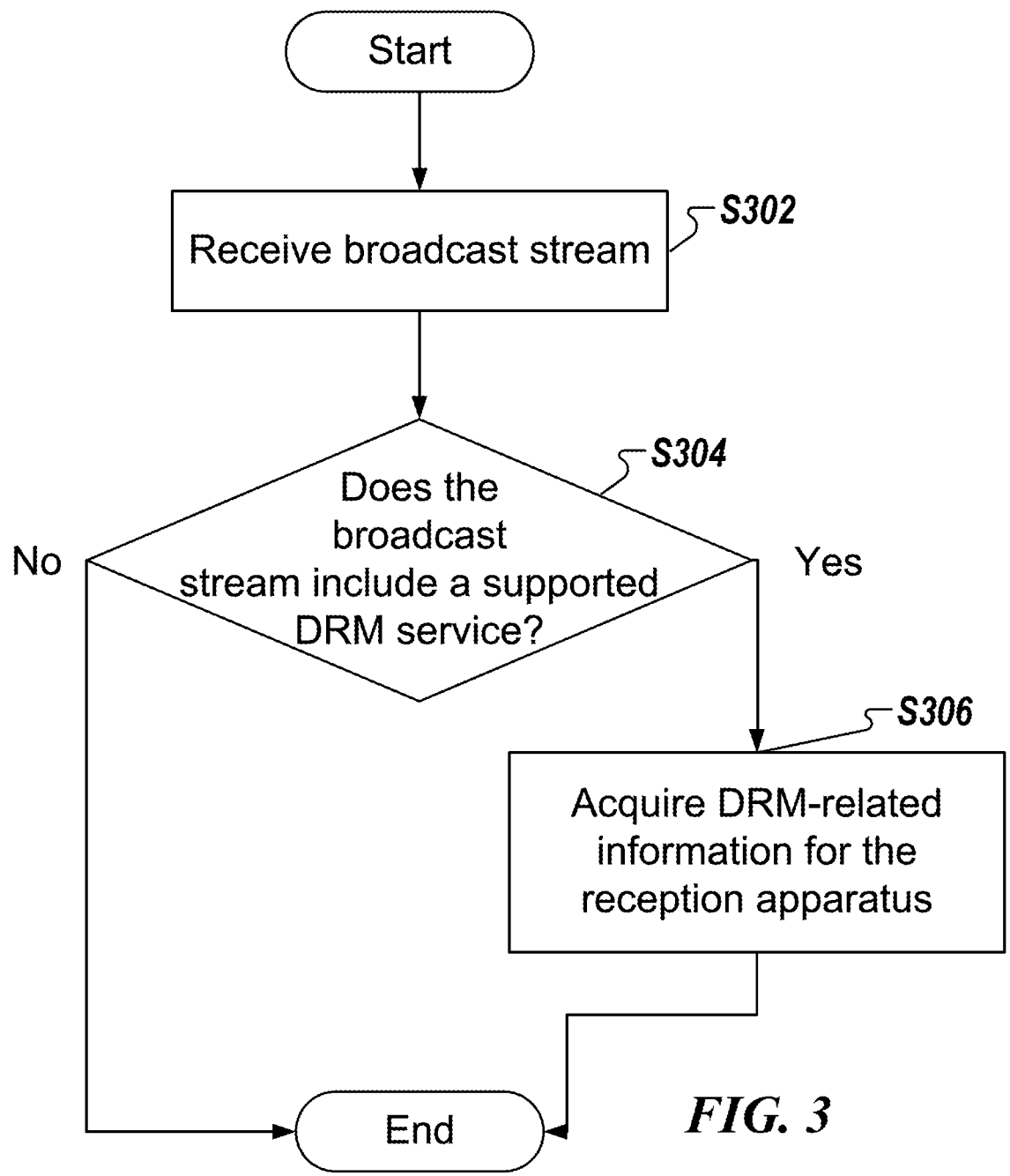
FIG. 3 illustrates an exemplary method for acquiring DRM-related information.

FIG. 3 illustrates an exemplary method of the reception apparatus 20 for acquiring DRM-related information from the broadcast stream. In step S302, receiver circuitry of the reception apparatus 20 receives a broadcast stream from the service provider 10. The broadcast stream is broadcast over a radio frequency (RF) channel according to one embodiment. The broadcast stream may be received in response to a user's selection of a channel associated with the broadcast stream, or the processing circuitry of the reception apparatus 20 otherwise accesses the broadcast stream to acquire information (e.g., Electronic Service Guide (ESG) data or DRM-related information)

In step S304, the processing circuitry of the reception apparatus 20 determines whether the broadcast stream includes one or more DRM services that are supported by the reception apparatus 20. When the broadcast stream is determined to include one or more DRM services that are supported by the reception apparatus 20 in step S304, the processing circuitry of the reception apparatus 20 acquires DRM-related information, which is associated with the reception apparatus 20, from the broadcast stream in step S306. When the broadcast stream is determined not to include a DRM service that is supported by the reception apparatus 20, the processing circuitry does not acquire any DRM-related information from the broadcast stream.

Figure 4:
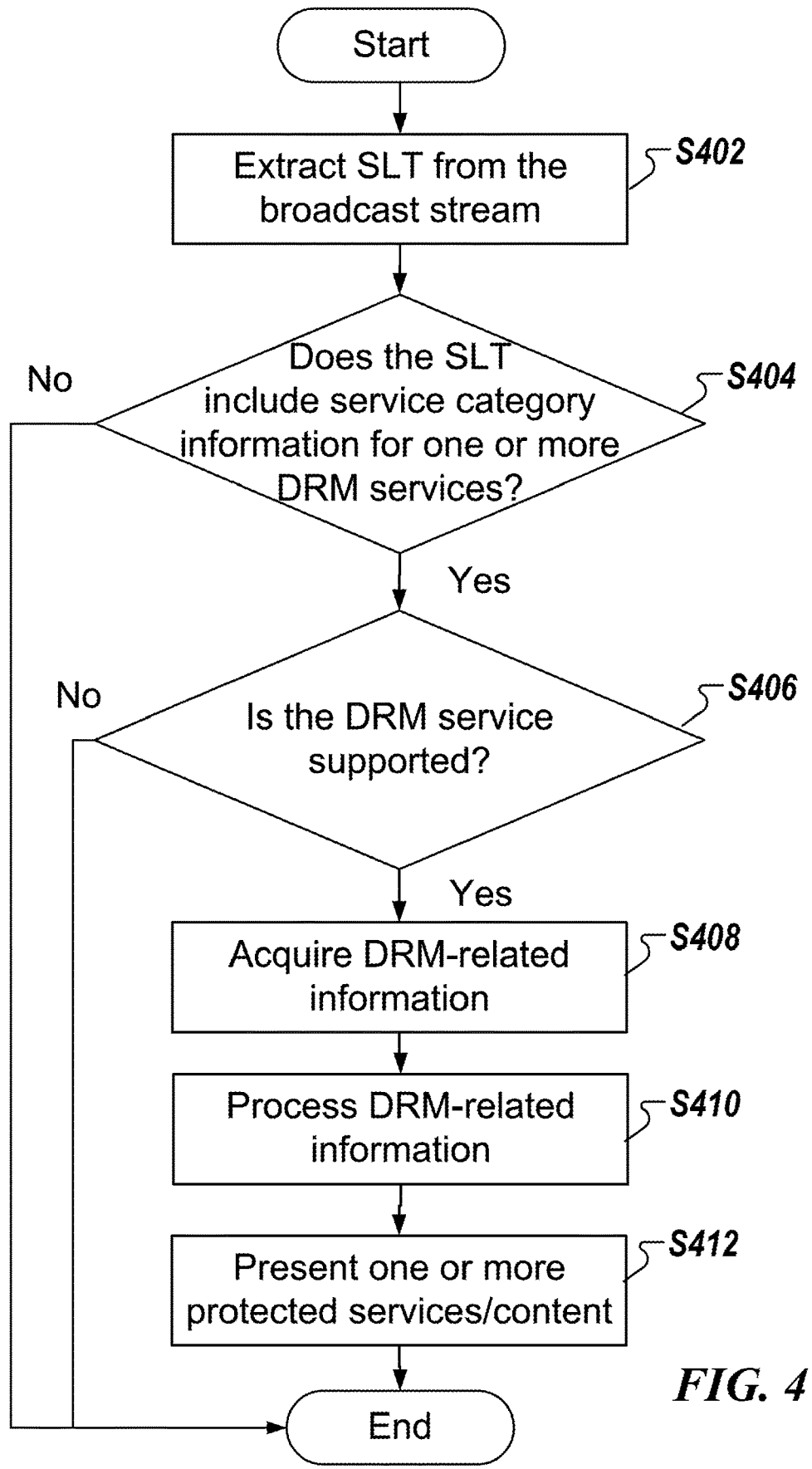
FIG. 4 illustrates an exemplary method for determining whether a supported DRM service is available.

FIG. 4 illustrates an exemplary method for determining whether the broadcast stream includes a DRM service that is supported by the reception apparatus 20. In certain embodiments, a Service List Table (SLT) is utilized to determine if the broadcast stream includes DRM-related information. The SLT may be included in Low Level Signaling (LLS), an example of which is described in ATSC Proposed Standard A/331—Signaling, Delivery, Synchronization, and Error Protection (Doc 533-174r7), which is incorporated herein by reference in its entirety. The LLS information may include one or a combination of the SLT, Rating Region Table (RRT), System Time fragment, Advanced Emergency Alert Table (AEAT), and Onscreen Message Notification fragment. The LLS information is carried in the payload of IP packets with an address/port dedicated to this function.

A DRM service provides the DRM-related information according to one embodiment. Further, the DRM service may be identified using the SLT. For example, the DRM service is identified using a Service Category element, or other elements or attributes, defined in the SLT.

An exemplary SLT is illustrated in Table 1 below. The function of the SLT is similar to that of the Program Association Table (PAT) in MPEG-2 Systems, and the Fast Information Channel (FIC) found in ATSC Mobile DTV Standard A/153, Part 3 (Doc. A/153 Part 3:2013), which is incorporated herein by reference in its entirety. For the reception apparatus 20 that first encounters a broadcast emission of the broadcast stream, the SLT supports a rapid channel scan which allows the reception apparatus 20 to build a list of the services in the broadcast stream that it can receive, with their channel name, channel number, etc. The SLT includes information to allow the presentation of a service list that is meaningful to viewers and that can support initial selection of each service via a channel number or up/down selection and information necessary to locate the Service Layer Signaling (SLS) for each service listed to support rapid channel scans and service acquisition.

Table 1 defines the structure of the SLT according to one embodiment. Different combinations of the elements defined in Table 1 may be utilized for the SLT in other embodiments.

TABLE 1

Exemplary SLT XML Format

| Element or Attribute Name | Use | Data Type | Short Description |
|---|---|---|---|
| SLT | | | Root element of the SLT |
| @bsid | 1 | slt:listOfUnsignedShort | Identifies the one or more Broadcast Streams comprising the Services. |
| SLTCapabilities | 0 . . . 1 | sa:CapabilitiesType | Required capabilities for decoding and meaningfully presenting the content for all the services in this SLT instance. |
| SLTInetUrl | 0 . . . N | anyURI | Base URL to acquire ESG or service layer signalling files available via broadband for services in this SLT. |
| @urlType | 1 | unsignedByte | Type of files available with this URL |
| Service | 1 . . . N | | Service information |
| @serviceId | 1 | unsignedShort | Integer number that identifies this Service within the scope of this Broadcast area. |
| @globalServiceId | 0 . . . 1 | anyURI | A globally unique URI that identifies the ATSC 3.0 Service. This attribute may be present for DRM services and is not present for the ESG and EAS services. |
| @sltSvcSeqNum | 1 | unsignedByte | Version of SLT service info for this service. |
| @protected | 0 . . . 1 | boolean | Indicates whether one or more components needed for meaningful presentation of this service are protected (e.g., encrypted). |
| @majorChannelNo | 0 . . . 1 | unsignedShort 1 . . . 999 | Major channel number of the service |
| @minorChannelNo | 0 . . . 1 | unsignedShort 1 . . . 999 | Minor channel number of the service |
| @serviceCategory | 1 | unsignedByte | Service category, coded per Table 3 |
| @shortServiceName | 0 . . . 1 | string | Short name of the Service |
| @hidden | 0 . . . 1 | boolean | Indicates whether the service is intended for testing or proprietary use, and is not to be selected by ordinary TV receivers. |
| @broadbandAccessRequired | 0 . . . 1 | boolean | Indicates whether broadband access is required for a receiver to make a meaningful presentation of the service. |
| @essential | 0 . . . 1 | boolean | Indicates if the essential portion of the Service is delivered via this Broadcast Stream. |
| SimulcastTSID | 0 . . . 1 | unsignedShort | Identifier of an ATSC 1.0 broadcast stream carrying the same programming content. |
| @simulcastMajorChannelNo | 0 . . .1 | unsignedShort 1 . . . 999 | Major channel number of the ATSC 1.0 service carrying the same programming content. |
| @simulcastMinorChannelNo | 0 . . . 1 | unsignedShort 1 . . . 999 | Minor channel number of the ATSC 1.0 service carrying the same programming content. |
| SvcCapabilities | 0 . . . 1 | sa:CapabilitiesType | Required capabilities for decoding and meaningfully presenting content of this service. |
| BroadcastSvcSignaling | 0 . . . 1 | | Location, protocol, address, id information for broadcast signaling |
| @slsProtocol | 1 | unsignedByte | Protocol used to deliver the service layer signalling for this service |
| @slsMajorProtocolVersion | 0 . . . 1 | unsignedByte | Major version number of protocol used to deliver Service Layer Signalling for this service. |
| @slsMinorProtocolVersion | 0 . . . 1 | unsignedByte | Minor version number of protocol used to deliver Service Layer Signalling for this service. |
| @slsDestinationIpAddress | 1 | IPv4address | A string containing the dotted-IPv4 destination address of the packets carrying broadcast SLS data for this service. |
| @slsDestinationUdpPort | 1 | unsignedShort | Port number of the packets carrying broadcast SLS data for this service. |
| @slsSourceIpAddress | 0 . . . 1 | IPv4address | A string containing the dotted-IPv4 source address of the packets carrying broadcast SLS data for this service. |
| SvcInetUrl | 0 . . . N | anyURI | URL to access Internet signalling for this service |
| @urlType | 1 | unsignedByte | Type of files available with this URL |
| OtherBsid | 0 . . . N | slt:listOfUnsignedShort | Identifier(s) of other Broadcast Stream(s) that deliver duplicates or portions of this Service |
| @type | 1 | unsignedByte | Indicates whether the Broadcast Stream identified by the OtherBsid delivers a duplicate or a portion of this service. |

The following text specifies exemplary semantics of the elements and attributes in the SLT according to one embodiment.

SLT—Root element of the SLT.

@bsid—This list of one or more 16-bit unsigned integers identifies the Broadcast Stream ID(s) of the original emission signal(s). The value of each @bsid is the same as the value signaled in L1D_bsid in L1-Detail Signaling in the physical layer. See, e.g., ATSC Standard A/322—Physical Layer Protocol (Doc. A/322:2017), which is incorporated by reference in its entirety. In the case that the Service is delivered via channel bonding at the physical layer, the list includes the BSID value of each RF emission involved in the bonding.

SLTCapabilities—Required capabilities for decoding and meaningfully presenting the content for all the services in this SLT instance. The syntax and semantics of the SLTCapabilities element is the same as, for example, the sa:Capabilities element specified under the Content fragment of ATSC Standard A/332—Service Announcement (Doc. A/332-2017), which is incorporated herein by reference in its entirety.

SLTInetUrl—Base URL to acquire ESG or service layer signaling files for all services in this SLT via broadband, if available.

@urlType—Type of files available with the sltInetUrl (ESG or service layer signaling). See Table 2 for values.

@protected—When set to "true" indicates that one or more components necessary for meaningful presentation is protected via DRM. When set to "false", indicates that no components necessary for meaningful presentation of the service are so protected. Default value is "false".

@majorChannelNo—An integer number in the range 1 to 999 that represents the "major" channel number of the service. Assignment of major channel numbers follows the guidelines given, for example, in Annex B of ATSC Standard A/65—Program and System Information Protocol for Terrestrial Broadcast and Cable, which is incorporated herein by reference in its entirety, in order to guarantee that the two-part channel number combinations used by a licensee of an ATSC 3.0 broadcast will be different from those used by any other such licensee with an overlapping DTV Service Area. Note that an ATSC 3.0 broadcast Service may use the same two-part channel number combination in use in an ATSC A/53 broadcast within the DTV Service Area, given equivalent programming between the two. Specification of a @majorChannelNo is not required for services that are not intended to be selected directly by viewers, such as an ESG data delivery service, an EAS rich media delivery service, or a DRM service.

@minorChannelNo—An integer number in the range 1 to 999 that represents the "minor" channel number of the service. This number is not required for services that are not

TABLE 2

Exemplary Code Values for urlType

| urlType | Meaning |
| --- | --- |
| 0 | ATSC Reserved |
| 1 | URL of Service Layer Signaling Server (providing access to the Service Layer Signaling, as specified in Section 7). |
| 2 | URL of ESG server (providing access to the ESG data, as specified in A/332, Section 5.5.2 for example) |
| 3 | URL of Service Usage Data Gathering Report server (for use in reporting service usage, as specified for example in ATSC Standard A/333 - Service Usage Reporting (Doc. A/333:2017), which is incorporated herein by reference in its entirety.) |
| 4 | URL of Dynamic Event WebSocket Server (providing access to the dynamic events via WebSocket protocol, as specified for example in ATSC Candidate Standard N/337 - Application Signaling (Doc. S33-215r3), which is incorporated herein by reference in its entirety.) |
| Other values | ATSC Reserved |

Service—Service information.

@serviceId—16-bit integer that uniquely identifies this Service within the scope of this Broadcast area.

@globalServiceId—The globally unique URI value that represents the identity of this ATSC 3.0 Service. This attribute provides the linkage to, and its value is identical to that of the Service@globalServiceId attribute in the ESG defined, for example, in ATSC Standard A/332 for this Service. This attribute is present for the Linear A/V, Linear audio only, and App-based services. In one embodiment, this attribute is further to be present for DRM services, for example in the case of DRM system ID signaling, as described below.

@sltSvcSeqNum—This integer number indicates the sequence number of the SLT service information with service ID equal to the serviceId attribute above. sltSvcSeqNum value starts at 0 for each service and is incremented by 1 every time any attribute or child of this Service element is changed. If no attribute or child element values are changed compared to the previous Service element with a particular value of serviceId then sltSvcSeqNum is not incremented. The sltSvcSeqNum field wraps back to 0 after reaching the maximum value.

intended to be selected directly by viewers, such as an ESG data delivery service, an EAS rich media delivery service, or a DRM service.

@serviceCategory—8-bit integer that indicates the category of this service. The value is coded according to Table 3, in one embodiment.

TABLE 3

Exemplary Code Values for SLT.Service@serviceCategory

| serviceCategory | Meaning |
| --- | --- |
| 0 | ATSC Reserved |
| 1 | Linear A/V service |
| 2 | Linear audio only service |
| 3 | App-based service |
| 4 | ESG service (program guide) |
| 5 | EAS service (emergency alert) |
| 6 | DRM service (DRM-related information) |
| Other values | ATSC Reserved |

@shortServiceName—Short name of the Service (up to 7 characters). This name is not required for services that are not intended to be selected directly by viewers, such as an ESG data delivery service or an EAS rich media delivery service. In one embodiment, this name is required for DRM services, for example in the case of DRM system ID signaling, as described below.

@hidden—Boolean value that when present and set to "true" indicates that the service is intended for testing or proprietary use, and is not intended to be selected by ordinary TV receivers. The default value is "false" when not present.

@broadbandAccessRequired—A Boolean indicating that broadband access is required for a receiver to make a meaningful presentation of the service. Default value is false.

@essential—When this Boolean attribute is present, it indicates that this Service has more than one portion delivered via more than one RF channel. When this attribute is not present, it indicates that all portions of this service are delivered via this RF channel. When this attribute is set to "true", it indicates that the essential portion of this Service is delivered via this Broadcast Stream. When this attribute is set to "false", it indicates that the non-essential portion of this Service is delivered via this Broadcast Stream. When this Boolean attribute is present with value as "true", at least one OtherBsid element with @type equal to "2" is present for this Service. When not present, there is no default value.

SimulcastTSID—This 16-bit number, when present, references the TSID value of an ATSC 1.0 broadcast emission carrying the same programming content, on the virtual channel identified with SimulcastTSID@simulcastMajorChannelNo if present and Service@majorChannelNo if not present, and SimulcastTSID@simulcastMinorChannelNo if present and Service@minorChannelNo if not present, as is being broadcast in this ATSC 3.0 Service. The TSID is specified in ISO/IEC 13818-1 (MPEG-2 Systems), which is incorporated by reference in its entirety, and as used in ATSC A/65. When not present, the programming content on this Service is not associated with any ATSC 1.0 virtual channel in the local broadcast area.

@simulcastMajorChannelNo—An integer number in the range 1 to 999 that represents the "major" channel number of an ATSC 1.0 broadcast service carrying the same programming content, if present. If not present, Service@majorChannelNo represents the "major" channel number of an ATSC 1.0 broadcast service carrying the same programming content.

@simulcastMinorChannelNo—An integer number in the range 1 to 999 that represents the "minor" channel number of an ATSC 1.0 broadcast service carrying the same programming content, if present. If not present, Service@minorChannelNo represents the "minor" channel number of an ATSC 1.0 broadcast service carrying the same programming content.

SvcCapabilities—Required capabilities for decoding and meaningfully presenting the content for the service with service ID equal to the @serviceId attribute above. The syntax and semantics of the SvcCapabilities element is, for example, the same as the sa:Capabilities element specified under the Content fragment of the ATSC 3.0 Service Announcement specification A/332.

BroadcastSvcSignaling—This element and its attributes provides broadcast signaling related information. When the BroadcastSvcSignaling sub-element is not present, then either (a) an element SvcInetUrl of the Service element (i.e., Service.SvcInetUrl element) is present with its urlType attribute (i.e., Service.SvcInetUrl@urlType) value equal to 1 (URL to SLS server), or (b) an element SLTInetUrl is present as a child element of the SLT root element (i.e., SLT.SLTInetUrl) with its urlType attribute (i.e., SLT.SLTInetUrl@urlType) value equal to 1 (URL to Signaling Server). In the latter case, the SLTInetUrl supports the <service_id> path term where service_id corresponds to the @serviceId attribute for the Service element (i.e., Service@serviceId attribute).

@slsProtocol—An attribute indicating the type of delivery protocol of Service Layer Signaling used by this service, coded according to Table 4 for example.

TABLE 4

Exemplary Code Values for
SLT.Service.BroadcastSvcSignaling@slsProtocol

| slsProtocol | Meaning |
| --- | --- |
| 0 | ATSC Reserved |
| 1 | ROUTE |
| 2 | MMTP |
| other values | ATSC Reserved |

@slsMajorProtocolVersion—Major version number of the protocol used to deliver the Service Layer Signaling for this service. Default value is 1.

@slsMinorProtocolVersion—Minor version number of the protocol used to deliver the Service Layer Signaling for this service. Default value is 0.

@slsDestinationIpAddress—A string containing the dotted-IPv4 destination address of the packets carrying SLS data for this service. The syntax is defined for example in RFC 3986, which is incorporated by reference in its entirety, Section 3.2.2.

@slsDestinationUdpPort—Port number of the packets carrying SLS data for this service.

@slsSourceIpAddress—A string containing the dotted-IPv4 source address of the packets carrying SLS data for this service. The syntax is defined for example in RFC 3986 section 3.2.2. This attribute is present when the value of @slsProtocol is 1.

SvcInetUrl—Base URL to access ESG or service layer signaling files for this service via broadband, if available.

@urlType—Type of files available with SvcInetUrl. See Table 2 for exemplary values.

As illustrated in Table 1, the SLT includes service information for one or more services included in the broadcast stream. The SLT includes a Service Category element for each service defined in the SLT. The function of the Service Categories is to signal the availability of different types of services to the reception apparatus 20.

In one embodiment, a DRM service is identified by a DRM service category in the SLT. For example, as illustrated in Table 3 above, a code value of 6 in SLT.Service@serviceCategory corresponds to the DRM service category. For example, the linear A/V service is an ordinary "watch TV" linear broadcast service, the App-based service is a service whose user experience is defined by the service providers as the reception apparatus 20 downloads and launches a BA, the ESG service provides the reception apparatus 20 the data needed for its native ESG functionality, and the EAS service provides the reception apparatus 20 access to media (e.g., photos, audio, video, text) related to an emergency alert). The linear A/V service, linear audio only service, and/or app-based service delivered in the broadcast stream may be protected or include protected content. One or more DRM services provided in the broadcast stream could deliver the DRM-related information need by the reception apparatus 20 to access the protected service or content.

Further, certain service types may not be directly selectable by a user, for example via the TV remote control. For example, the ESG, EAS, and DRM services are not directly selectable by the user.

As described above, the DRM service category is used to indicate delivery of DRM-related information according to certain embodiments. Zero or more services defined in any given instance of the SLT may be identified with Service@serviceCategory "DRM Service." Further, more than one DRM service may be identified in the SLT to support the case that the service provider 20 supports multiple DRM systems.

If a DRM service is listed in the SLT, the reception apparatus 20 uses the coordinates given in SLT.Service.BroadcastSvcSignaling to find the SLS tables associated with this DRM service, which include the Service-based Transport Session Instance Description (S-TSID), as defined for example in Section 7.1.4 of ATSC Proposed Standard A/331. The S-TSID provides the coordinates of the Real-time Object delivery over Unidirectional transport (ROUTE) sessions, and constituent Layered Coding Transport (LCT) channel which will carry files associated with the DRM service. For example, in the case of a DRM service, the LCT channel may carry DRM-related information files such as DRM licenses.

A reception apparatus that is not DRM-capable will disregard services of type "DRM Service" and thus will not look at any transport packets associated with LCT channels carrying DRM-related information files. This fulfills one of the requirements not to "confuse" reception apparatuses or cause unnecessary download and storage of files into a memory of the reception apparatus.

As illustrated in FIG. 4, a reception apparatus 20, if it supports a DRM system, determines whether the broadcast stream includes a DRM service that is supported by the reception apparatus 20 based on the SLT according to one embodiment. In step S402, the processing circuitry of the reception apparatus 20 extracts the SLT from the broadcast stream. The SLT is extracted from LLS information in the broadcast stream according to one embodiment.

In step S404, the processing circuitry of the reception apparatus 20 determines whether the SLT includes service category information for a DRM service. For example, the processing circuitry checks the service category information included in the SLT for each of a plurality of services in the broadcast stream. The processing circuitry checks, for example, the code value of each SLT.Service@serviceCategory for a serviceCategory value corresponding to a DRM service.

The processing circuitry of the reception apparatus 20 determines whether each DRM service determined to be included in the broadcasts stream is supported by the reception apparatus 20 in step S406. In one embodiment, the processing circuitry of the reception apparatus 20 determines that the broadcast stream includes a supported DRM service based on the determination that the SLT includes a predetermined serviceCategory value corresponding to a DRM service (e.g., serviceCategory value 6) supported by the reception apparatus 20.

When the reception apparatus 20 determines that the broadcast stream includes one or more supported DRM services in step S406, the reception apparatus 20 acquires DRM-related information from the one or more supported DRM services in step S408, processes the DRM-related information in step S410, and presents one or more protected services and/or content in the broadcast stream in step S412 using the processed DRM-related information. The processing in step S410 may include extracting a decryption key from the DRM-related information, or otherwise parsing the DRM-related information if necessary, for forwarding to a Content Decryption Module (CDM).

In one embodiment, the determination in step S406 is performed when different DRM systems (e.g., a Marlin DRM system, a Microsoft PlayReady DRM system) are used, for example, by one or more service providers 10 or to allow for future use of one or more additional DRM systems. For example, the same service provider 10 may provide the same or different service or content that is protected using multiple DRM systems to allow reception apparatuses 20 having different DRM capabilities to access the service or content. In another example, a first service provider 10 provides a first service or content that is protected using a first DRM system while a second service provider 10 provides a service or content that is protected using a second DRM system, which is different from the first DRM system.

DRM system ID signaling is provided in the broadcast stream according to one embodiment to allow the reception apparatus 20 to identify the one or more DRM systems utilized by a service provider 10. The DRM system ID signaling allows the reception apparatuses 20 to discard DRM-related information (e.g., DRM license files) not associated with a supported DRM provider and process DRM-related information associated with a supported DRM provider. Further, when the reception apparatus 20 supports multiple DRM systems, the DRM system ID signaling helps the reception apparatus 20 to route the DRM-related files to the proper CDM for processing.

The DRM system ID signaling identifies at least one DRM system that is associated with one or more DRM services in the broadcast stream. In one embodiment, the DRM system ID signaling is provided at the level of the SLT. The DRM system ID may be signaled in one of the fields in the SLT such as the SLT.Service@shortServiceName string or the SLT.Service@globalServiceID string when the service category is DRM Service.

However, the DRM system ID may be signaled in other fields in the SLT. A new DRM system ID attribute (e.g., SLT.Service@DRMsystemID) could be added for each service or DRM service in the SLT. The DRM system ID may be signaled by using different Service Category values in the SLT. For example, Service Category value 6 may correspond to a DRM service associated with a first DRM system and Service Category value 7 may correspond to a DRM service associated with a second DRM system, which is different from the first DRM system. Further, in one embodiment, the DRM system ID may be signaled in, or otherwise provided with, the DRM-related information (e.g., header fields as described below).

The DRM system ID may be identified by a Universally Unique Identifier (UUID) registered by DASH Industry Forum, in accordance with MPEG DASH (ISO/IEC 23009-1) and the DASH-IF *Guidelines for Implementation: Dash-IF Interoperability Points, Version* 4.0, which are hereby incorporated by reference in their entirety. For example, the UUID string value "5E629AF5-38DA-4063-8977-

97FFBD9902D4" corresponds to Marlin Adaptive Streaming Specification—Simple Profile, V1.0, which is hereby incorporated by reference in its entirety. However, other unique identifiers could be used for the DRM system ID.

In one embodiment, the format of the DRM system ID is "urn:uuid:<uuid>" when signaled in the SLT.Service@ global ServiceID string. <uuid> may be registered with DASH-IF as described above in one example. Further, in one embodiment, where the UUID is included in a URI such as in the case of the global service ID, the URI is defined as "urn:uuid:xxxxxxxx-xxxx-xxxx-xxxx-xxxxxxxxxxxx", where each "x" is a hex digit.

Figure 5:
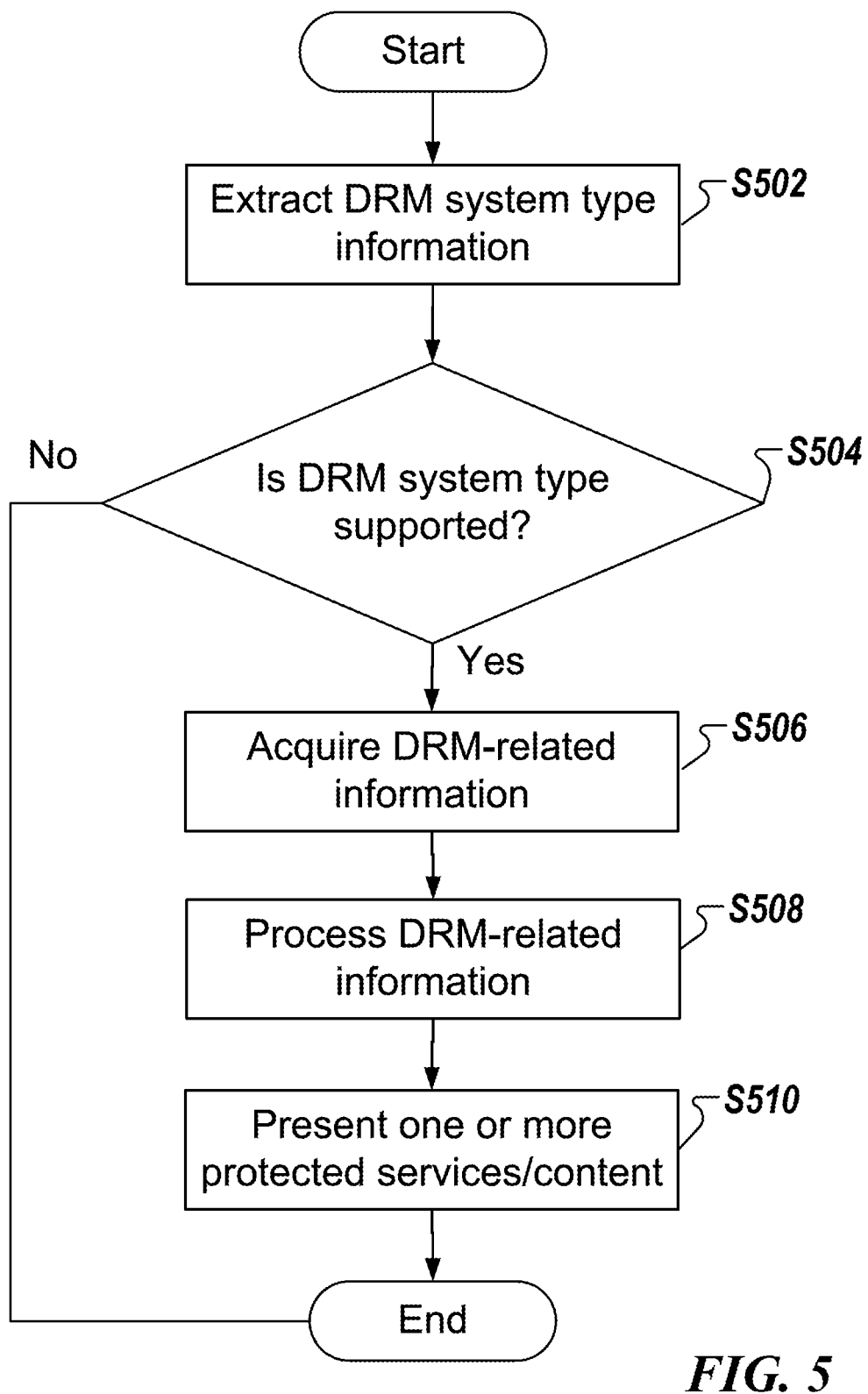
FIG. 5 illustrates an exemplary method for determining whether a DRM system type is supported.

FIG. 5 illustrates an exemplary method for determining if one or more DRM services is supported using the SLT when different DRM systems may be utilized. In step S502, the processing circuitry of the reception apparatus 20 extracts DRM system type information (e.g., a DRM system ID) from the SLT. For example, the processing circuitry extracts the DRM system type information for the one or more DRM services from a short service name (e.g., SLT.Service@shortServiceName string) or global service identifier (e.g., SLT.Service@globalServiceID string) in the SLT that is associated with the one or more DRM services.

In step S504, the processing circuitry of the reception apparatus 20 determines whether the DRM system type identified in the extracted DRM system type information is supported by the reception apparatus 20. For example, the processing circuitry of the reception apparatus 2 compares the DRM system type information (e.g., a DRM system ID such as a UUID) with a DRM system ID of any supported DRM systems. The processing circuitry determines that the DRM system is supported when the DRM system ID indicated in the DRM system type information and the DRM system ID of any supported DRM systems match.

When the reception apparatus 20 determines that the broadcast stream includes one or more DRM services associated with a supported DRM system in step S504, the reception apparatus 20 acquires DRM-related information from the one or more supported DRM services in step S406, processes the DRM-related information in step S508, and presents one or more protected services and/or content in the broadcast stream in step S510 using the processed DRM-related information (e.g., a decryption key included in the DRM-related information). The processing in step S508 may include extracting a decryption key from the DRM-related information, or otherwise parsing the DRM-related information if necessary, for forwarding to a CDM.

The processing circuitry disregards DRM services in the broadcast stream that are associated with a DRM system ID of a DRM provider that is not supported by the reception apparatus 20. For example, when the reception apparatus 20 supports only one DRM system and there are no DRM Services listed in the SLT associated with the DRM system ID of the supported DRM system, the reception apparatus 20 knows that there is no benefit to monitoring any DRM Services in the broadcast stream.

As described above with respect to FIG. 3, the reception apparatus 20 in step S306 acquires DRM-related information for the reception apparatus 20 when the broadcast stream is determined to include one or more supported DRM services. In one embodiment, the DRM-related information is delivered in the ROUTE protocol.

According to certain embodiments, NRT files are delivered by the ROUTE protocol, which is described for example in ATSC Proposed Standard A/331. ROUTE is a variant of File Delivery over Unidirectional Transport (FLUTE) defined in RFC 6726 in which Asynchronous Layer Coding (ALC) defined in RFC 5775 and LCT defined in RFC 5651 are used to deliver files fragmented into IP packets. RFC 6726, 5775, and 5651 are hereby incorporated by reference in their entirety.

The delivery of any file object involves a packet structure including a Transport Session Identifier (TSI), and within the TSI, a Transport Object Indicator (TOI) associated with each file. Each LCT channel is associated with an IP address/port combination and a TSI value.

As mentioned, according to certain embodiments, a service defined in the SLT as a DRM service includes a BroadcastSvcSignaling element, which provides the destination IP address and port of broadcast packets carrying SLS data for the service. For a DRM service, the ROUTE protocol is used (SLT.Service.BroadcastSvcSignaling@slsProtocol="1" indicating ROUTE). For ROUTE-based services, the SLS data is delivered by an LCT channel in the referenced IP packets. The SLS fragments are delivered on a dedicated LCT transport channel with TSI=0. One of the SLS tables, the S-TSID, identifies one or more ROUTE sessions carrying files related to the service. Each ROUTE session includes one or more LCT channels. Each LCT channel is associated with a unique value of TSI. The S-TSID may also include an Extended File Description Table (EFDT). Alternatively, the EFDT may be transported separately using a special value of TOI, value 0. The latter method is compatible with FLUTE as defined in RFC 6726.

ROUTE defines an Extended File Description Table (EFDT) as an extension to the File Description Table (FDT) defined in the FLUTE RFC 6726, which provides information about files associated with the LCT channel, including the URL (Content-Location/filename), Content-Type (a.k.a. Internet Media Type, or MIME Type), Content-Length, Content-Encoding, and other parameters.

Files may be transported in an LCT channel without an FDT or EFDT, or without any matching entry for the file in the FDT/EFDT using ROUTE "Entity Mode." In Entity Mode, the file object includes an "entity header" portion preceding the actual content of the file, analogous to the entity header received when internet clients retrieve files via HTTP GET operations from internet servers. The entity header portion includes at least Content-Location, and can include Content-Type, and other items. The reception apparatus 20 can collect file objects in the LCT channel by assembling all packets with a common TOI value. For reassembly of the packets, each packet indicates, in an LCT header field called start_offset, the location within the file buffer to place each received fragment.

In the case of DRM-related information (e.g., DRM licenses) prepared individually for a large number of reception apparatuses 20, the number of different files to be delivered can be nearly as large as the population of reception apparatuses 20 in a geographic area which is relying on broadcast delivery of the DRM-related information. Thus, the number could be quite large (hundreds of thousands), and consequently it may not be practical to list each file individually in the FDT.

A file template may be used for delivery of a sequence of DRM-related information files. An exemplary "file template" defined as an extension to the FDT-Instance element defined in FLUTE, RFC 6726, is illustrated in Table 5.

TABLE 5

Extensions to FDT-Instance Element

| Element or Attribute Name | Use | Data Type | Description |
|---|---|---|---|
| @efdtVersion | 0 . . . 1 | unsignedByte | The version of this Extended FDT instance descriptor. |
| @maxExpiresDelta | 0 . . . 1 | unsignedInt | Time interval for use in deriving the expiration time of the associated EFDT. |
| @maxTransportSize | 0 . . . 1 | unsignedInt | The maximum transport size of any object described by this EFDT. |
| @appContextIdList | 0 . . . 1 | afdt:uriList | A space-separated list of URIs representing one or more unique Application Context Identifiers. |
| @fileTemplate | 0 . . . 1 | string | Describes the means to generate the file URL, i.e., Content-Location attribute of the FDT. |
| @filterCodes | 0 . . . 1 | afdt:listOfUnsignedInt | Filter Codes applying to all files in the Source flow. |

The following text specifies the semantics of the elements and attributes in the Extensions to FDT-Instance Element according to one embodiment.

@efdtVersion—An 8-bit unsigned integer value that represents the version of this EFDT element. The version is increased by one modulo 256 each time the EFDT element is updated. @version is an ATSC-defined extension of the FLUTE FDT as specified in RFC 6726.

@maxExpiresDelta—A 32-bit unsigned integer value that represents a time interval in number of seconds, which when added to the wall-clock time at the receiver when it acquires the first ROUTE packet carrying the object described by this EFDT, represents the expiration time of the associated EFDT. If @maxExpiresDelta is not present, the expiration time of the EFDT is given by the sum of a) the value of the ERT field in the EXT_TIME LCT header extension in the ROUTE packet and b) the current receiver time when parsing the packet header. @maxExpiresDelta is an ATSC-defined extension of the FLUTE FDT as specified in RFC 6726.

@maxTransportSize—A 32-bit unsigned integer value that represents the maximum transport size in bytes of any delivery object described by this EFDT. This attribute is present if 1) the FDT-Instance@fileTemplate is present; or 2) one or more File elements in this EFDT do not include the @Transfer-Length attribute. When @maxTransportSize is not present, the maximum transport size is not signaled.

@appContextIdList—A list of unique URI values, separated by spaces, which when present, define one or more Application Context Identifiers associated with the containing elements. Files may be associated with multiple application contexts. The Application Context Identifier provides a mechanism of grouping files for use with Broadcaster Applications as defined in ATSC Candidate Standard A/344 (Doc. 534-230r4), which is incorporated herein by reference in its entirety.

Any Application Context Identifiers contained as an attribute of the Extended FDT element, FDT-Instance@appContextIdList, are associated with all files defined as children of the FDT-Instance data structure. Any Application Context Identifiers defined in the list attribute of the File element, File@appContextIdList, are associated with that file only. Thus, the total collection of Application Context Identifiers associated with a specific file includes the union of the two lists: File@appContextIdList and FDT-Instance@appContextIdList.

Each Application Context Identifier is a globally-unique URI that allows files to be grouped together. Receivers use the Application Context Identifier to provide access to the associated files such that the group of files from one Application Context Identifier is completely separate from the group of files assigned to another Application Context Identifier. A file may be associated with multiple Application Context Identifiers, each resulting in a different URL for accessing the file. In this way, files may be shared among applications.

@fileTemplate—A string value, which when present and in conjunction with parameter substitution, is used in deriving the file URL, i.e., the Content-Location attribute, for the delivery object described by this EFDT. The mechanism, as further described, for example, in Section A.3.3.2.7 of ATSC Proposed Standard A/331, involves substituting the TOI value of the delivery object for the pattern '$TOI$', in the string representation of @fileTemplate. The derived Content-Location is a relative URI conforming to the provisions of, for example ATSC Proposed Standard A/331 Section A.3.3.2.7 for broadcast-delivered resources. By this means, a one-to-one mapping is created between the TOI and the file URL. It also implies that in the event that each delivery object of the source flow is a DASH Segment, the Segment number will be equal to the TOI value of the object. The @fileTemplate attribute is present in the EFDT when the LCT channel carries a sequence of DASH Media Segment files.

@filterCodes—A space-separated list of 32-bit unsigned integers that represents Filter Codes that are associated with all files identified in this EFDT except for those files in which a File@fileFilterCode attribute is present, in which case the Filter Codes in the File@fileFilterCode attribute takes precedence.

According to one embodiment of the file template, if an LCT packet with a new TOI is received for this transport session, then an Extended FDT Instance is generated with a new File entry as follows:

The TOI is used to generate File@Content-Location. All other attributes that are present in the EFDT.FDT-Instance element are applicable to the File.

Either the EXT_FTI header (per RFC 5775) or the EXT_TOL header (per ATSC Proposed Standard A.331, Section A.4.2.6.1), when present, is used to signal the Transport Object Length (TOL) of the file. If the File@Transfer-Length parameter in the Extended FDT Instance is not present, then the EXT_TOL header or the EXT_FTI header is present. Note that a header containing the transport object length (EXT_TOL or EXT_FTI) need not be present in each packet header. If the broadcaster does not know the length of the transport object at the beginning of the transfer, an EXT_TOL or EXT_FTI header is included in at least the last packet of the file and should be included in the last few packets of the transfer.

If present, the @maxExpiresDelta is used to generate the value of the @Expires attribute. The receiver is expected to add this value to the current time to obtain the value for @Expires. If not present, the EXT_TIME header with Expected Residual Time (ERT) is used to extract the expiry time of the Extended FDT Instance. If both are present, the smaller of the two values should be used as the incremental time interval to be added to the receiver's current time to generate the effective value for the @Expires. If neither @maxExpiresDelta nor the ERT field of the EXT_TIME is present, then the expiration time of the Extended FDT is given by the Extended FDT Instance's @Expires attribute.

In one embodiment, the @fileTemplate attribute includes the "$TOI$" identifier. After parameter substitution using the TOI number in this transport session, the @fileTemplate is a valid URL corresponding to the Content-Location attribute of the associated file. Excluding the TOI values associated with any files listed in FDT-Instance.File elements, the @fileTemplate attribute generates a one-to-one mapping between the TOI and the Content-Location value. When the @fileTemplate is used to identify a sequence of DASH Media Segments, the Segment number is equal to the TOI value.

The Content-Location URL for each file is created from the TOI value associated with the reassembled packets forming the file. For example, for a @fileTemplate string of "exampleFile$TOI$.mp4", a file collected from packets with TOI value 556 would be understood to be a file with URL "exampleFile556.mp4".

Each identifier may be suffixed, within the enclosing '$' characters following this prototype:

%0[width]d

The width parameter is an unsigned integer that provides the minimum number of characters to be printed. If the value to be printed is shorter than this number, the result is padded with zeroes. The value is not truncated even if the result is larger.

An example @fileTemplate using a width of 5 is:

fileTemplate="myVideo$TOI %05d$.mps", resulting in file names with exactly five digits in the number portion. The Media Segment file name for TOI=33 using this template is "myVideo00033.mps."

The @fileTemplate is authored such that the application of the substitution process results in valid URIs.

Strings outside identifiers only contain characters that are permitted within URIs according to RFC 3986.

TABLE 7

Exemplary Identifiers for File Templates

| $<Identifier>$ | Substitution Parameter | Format |
| --- | --- | --- |
| $$ | Is an escape sequence, i.e., "$$" is non-recursively replaced with a single "$" | not applicable |
| $TOI$ | This identifier is substituted with the TOI. | The format tag may be present. If no format tag is present, a default format tag with width = 1 is used. |

The file template URL includes an identifier called "$TOI$" which is substituted with the value of the TOI for a given file (e.g., a binary file, XML file, zip file, or other compressed archive file) in a transport session. For example, if the FDT includes a fileTemplate defined as "MarlinLicense$TOI%10d$.bin" then a file reassembled from packets with TOI value 2155872260 would be understood to be the file MarlinLicense2155872260.bin. The file associated with TOI value 2 would be MarlinLicense0000000002.bin. These files contain DRM-related information according to one embodiment.

In addition to being a convenient method to allow a large number of sequential files to be delivered and defined in a ROUTE transport, an additional benefit of this coding can be gotten if the TOI value is defined by the DRM provider to be related to the device ID, or another unique identifier (e.g., MAC [Media Access Control] address), associated with the reception apparatus 20. In that case, reception apparatuses 20 can discard any DRM-related information file whose TOI value within the LCT channel does not match all or certain bits of that unit's device ID (or other unique identifier). For example, when the TOI value is 32 bits and the unit's device ID is 32 bits or larger, the least-significant 31 bits of the unit's device ID can be used for filtering. Other predetermined numbers of least-significant bits may be used in other embodiments. The use of the least 31 bits in this example allows the use of TOI=0 to be avoided for units whose lower 31 bits of the device ID is zero This quick filtering could allow the reception apparatuses 20 to save many CPU cycles.

An example of how the FDT-Instance@fileTemplate attribute could be used is as follows. The DRM provider could specify the following rules for delivery of unit-addressed DRM-related information files. This example assumes the device ID is 32 bits or more: (a) files targeted at the device will use TOI values equal to the 31 least-significant bits of the device ID; except (b) if the 31 least-significant bits of the device ID are zero, TOI value 2147483648 (0x80000000) is used.

The use of TOI value 2147483648 (0x80000000), or another predetermined TOI value, above takes into account the fact that TOI=0 is reserved for delivery of standalone FDTs, thus it cannot be associated with any other file object or associated with a file described by the file template.

An exemplary FDT-Instance element which could be used to deliver these example files is as follows:

<FDT-Instance
    fileTemplate="DRM-license-xyz-$TOI%10d$.bin">
    <File Content-Type="application/octet-stream" TOI="2147483648"
        Content-Location="DRM-license-xyz-0000000000.bin"">
    </File>
</FDT-Instance>

In the example above, "%10d" in the line beginning with "fileTemplate" designates the use of 10 digits for the TOI digit field. However, a different number of digits may be designated in other embodiments. Further, the lines beginning with "<File Content Type" and "Content-Location" define the use of TOI value 2147483648 for device IDs with the least-significant 31 bits equal to zeroes.

In cases where the device ID is longer than the number of examined bits (e.g., 31 bits), a given file can include licenses for multiple reception apparatuses 20 whose lower 31 bits, or other predetermined bits, match the TOI value (or the number field in the filename). The full device ID can be included inside the file itself, and a reception apparatus 20 can discard any DRM-related information not corresponding to its own device ID. Different numbers of examined bits can be used in different embodiments. For example, in the case of 16 examined bits, the reception apparatus 20 can discard 99.998% of files (65535 out of 65536) before determining (by inspecting the files contents) whether a file that is processed includes its own device ID.

In one embodiment, header fields delivered with the DRM-related information can be used to acquire DRM-related information for a reception apparatus 20, instead of using entries in the FDT-Instance (Extended FDT), as described above. For example, ATSC Proposed Standard A/331 describes Entity Mode as a method in which the HTTP header fields of a file are included in the delivery, preceding the contents of the file itself.

According to one embodiment, the delivery object in the Entity Mode is analogous to a representation in HTTP/1.1 and whose data is enclosed in the payload body of a HTTP message. The delivery object is described by metadata in the form of "entity headers" which correspond to one or more of the representation header fields, payload header fields, and response header fields as defined for example in Sections 3.1, 3.3 and 7, respectively, of RFC 7231, which is incorporated herein by reference in its entirety.

The header fields may include any of those elements that an HTTP server might include when delivering a file in response to an HTTP GET request from a client. HTTP header fields may include one or a combination of Content-Location, Content-Type, Content-Encoding, and Content-Length.

In the case that DRM-related information files are distributed in the broadcast stream, the ROUTE protocol, as described for example in ATSC Proposed Standard A/331 could be used. If Entity Mode is used, entries in the FDT-Instance (Extended FDT) could be omitted. Instead, files are reconstructed as the reception apparatus 20 collects packets associated with a given TOI value. After at least the header portion of the object is collected, the header fields can be inspected to find the Content-Location (filename), which could be defined in such a way that the reception apparatus 20 can determine right away whether the file pertains to itself or another. For example, the full device ID may be defined to be present within a known location in the filename (for example the last 12 characters preceding the "." and filename extension). Other HTTP header fields could also potentially serve this function, for example the Cookie field.

In one embodiment, signaling in the broadcast stream indicates to a reception apparatus 20, which is DRM capable, that DRM-related information is, or will be present in the broadcast stream (e.g., in a DRM service signaled in the SLT) during a particular time period of the day according to one embodiment. A "distribution window" may be included in the SLS for the DRM service. The "distribution window" may include one or more elements of the Distribution Window Description (DWD) signaling table defined in ATSC Candidate Standard A/337—Application Signaling (Doc. S33-215r3), which is incorporated herein by reference in its entirety. The DWD indicates that certain files that may be of interest to the reception apparatus 20 will be present in the broadcast emission beginning at a specified time of day, and ending at another specified time of day.

As described above, DRM-related information to support a given DRM system may be signaled in the SLT as a DRM service, and the DRM system ID for that system can be associated with that particular DRM service. Further, SLS tables including the DWD may be sent to provide information about the DRM-related information delivery for the particular DRM service.

The distribution window itself may be quite large, for example it might last from 1 am to 6 am each morning. During this 5-hour window, DRM-related information for each unit in the broadcast area can be sent. It would be desirable if the reception apparatus 20 could avoid the need to monitor the DRM service for the entire period of the window. Accordingly, in one embodiment, the DRM provider provides a hint to the reception apparatus 20 to optimize the operation when distribution windows are used:

In one embodiment, each reception apparatus 20 computes a number between 0.0 and 1.0 based on an algorithm dependent upon its device ID or other unique identifier associated with the reception apparatus 20. Any suitable algorithm is possible. One example is to use a predetermined number of the least-significant bits (e.g., the least-significant 16 bits) of the device ID as a binary fraction.

The reception apparatus 20 takes the computed number and uses it as guidance to refine the distribution window accordingly. For example, if the resulting number is 0.5, the reception apparatus 20 could begin monitoring the DRM service half-way through the distribution window. If the resulting number is 0.99, the reception apparatus 20 could begin monitoring near the end of the window period. The broadcaster could continue sending DRM-related information (e.g., DRM licenses in the form of license messages) past the end of the window until the full set has been transmitted. Further, in one embodiment, the reception apparatus 20 receives feedback from the CDM that the necessary DRM-related information (e.g., license or update) has been received, so that further processing of messages could be terminated (e.g., for the day, or longer).

Figure 6:
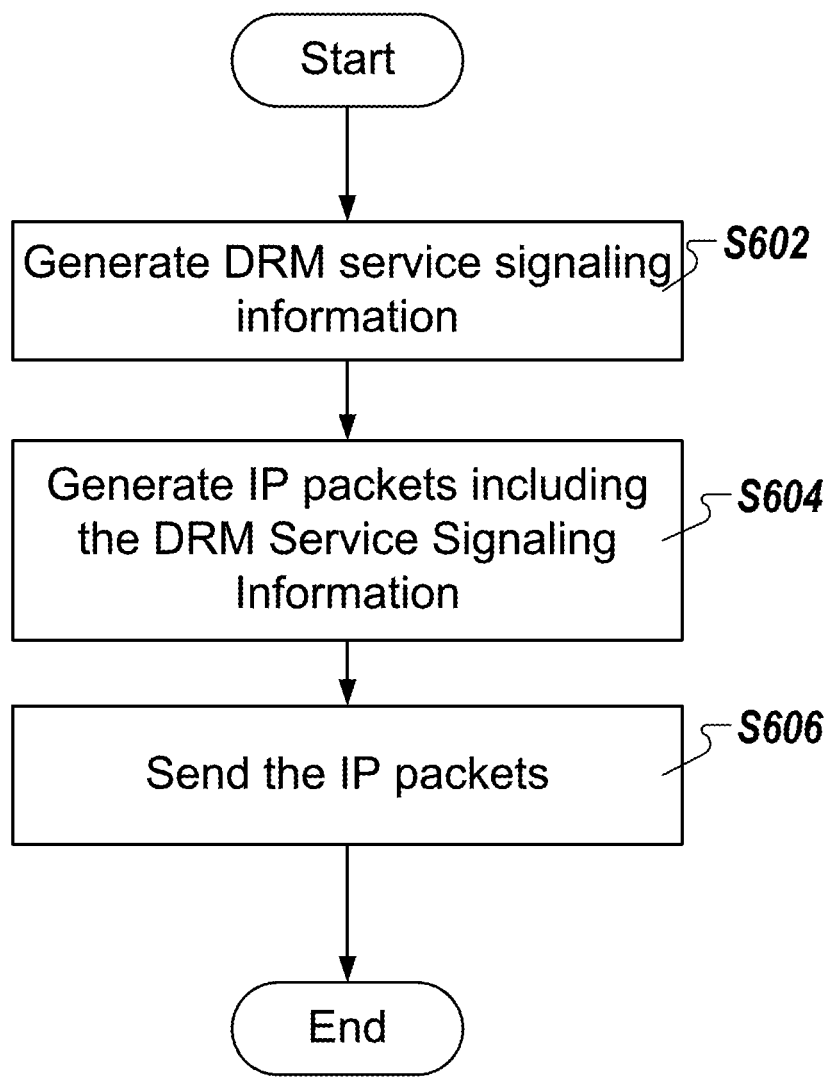
FIG. 6 illustrates an exemplary method for transporting DRM-related information.

FIG. 6 is a flowchart that shows the operation of a service distribution system of the service provider 10 according to one embodiment. In step S602, processing circuitry of the service distribution system generates DRM-related information and/or DRM service signaling information such as LLS data including the SLT according to the syntax in Table 1 for example. As described above, the SLT may indicate whether a data stream (e.g., a broadcast stream) includes one or more DRM services for delivering DRM-related information. The processing circuitry of the service distribution system may also generate DRM system ID information, FDT instances, HTTP header information, distribution window information, and/or any other information to facilitate the acquisition of DRM-related information by the reception apparatus 20, as described above for example.

In step S604, the processing circuitry of the service distribution system generates IP packets. The payloads of the IP packets include one or a combination of any of the DRM service signaling information and the DRM-related information generated in step S602. The IP packets have a predetermined address and destination port. Then, at step S604, a transmitter of the service distribution system transmits the IP packets. For example, the transmitter transmits a broadcast stream including the IP packets via a digital television terrestrial broadcast channel.

Figure 7:
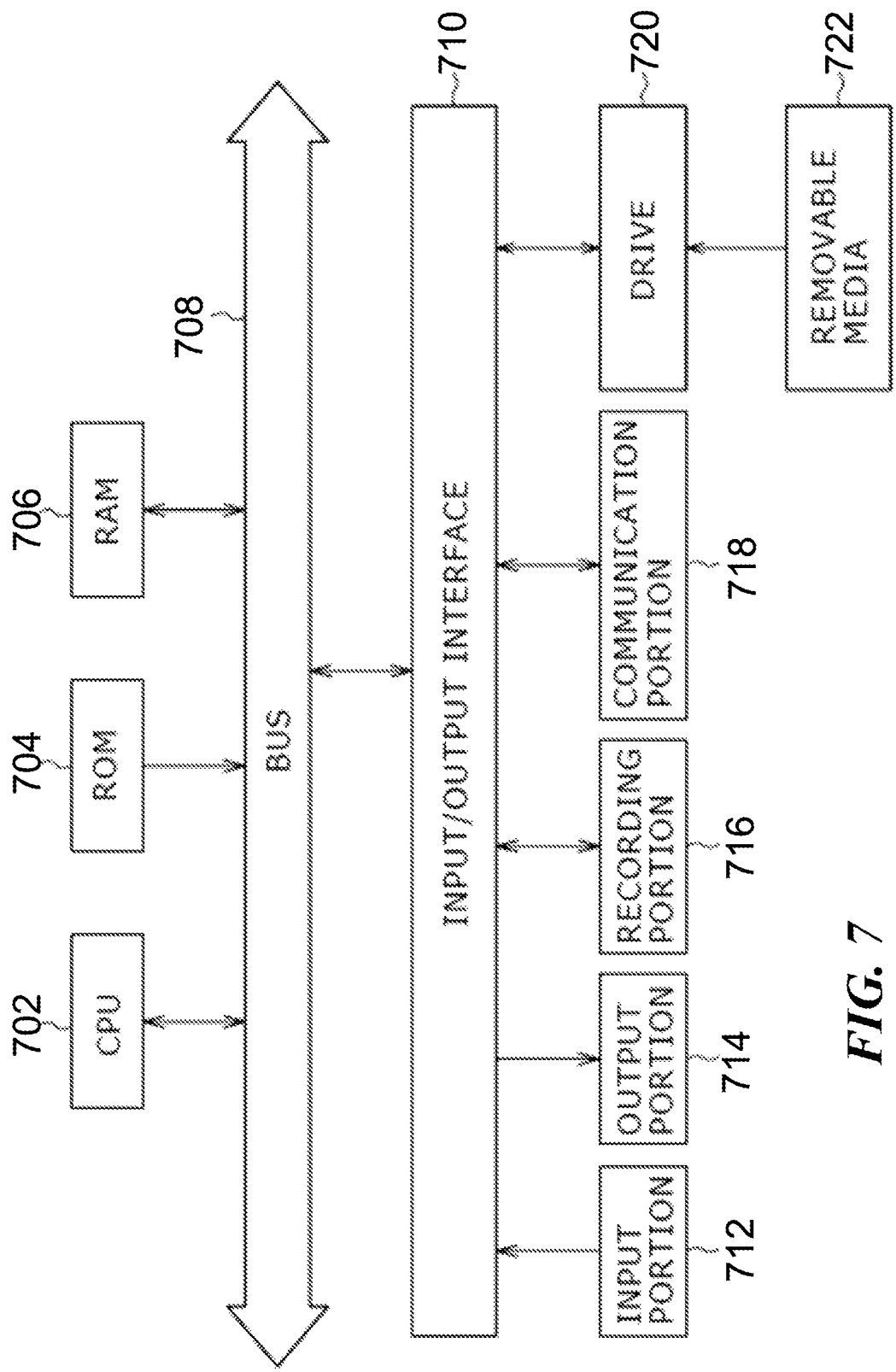
FIG. 7 illustrates an example of a hardware configuration of a computer.

FIG. 7 is a block diagram showing an example of a hardware configuration of a computer that can be configured to perform functions of any one or a combination of reception apparatus and service distribution system. For example, in one embodiment, the computer is configured to perform one or a combination of the functions described herein with respect the reception apparatus 20 and/or the service distribution apparatus.

As illustrated in FIG. 7 the computer includes a CPU 702, ROM (read only memory) 704, and a RAM (random access memory) 706 interconnected to each other via one or more buses 708. The one or more buses 708 are further connected with an input-output interface 710. The input-output interface 710 is connected with an input portion 712 formed by a keyboard, a mouse, a microphone, remote controller, etc. The input-output interface 710 is also connected an output portion 714 formed by an audio interface, video interface, display, speaker and the like; a recording portion 716 formed by a hard disk, a non-volatile memory or other non-transitory computer readable storage medium; a communication portion 718 formed by a network interface, modem, USB interface, fire wire interface, etc.; and a drive 720 for driving removable media 722 such as a magnetic disk, an optical disk, a magneto-optical disk, a semiconductor memory, etc.

According to one embodiment, the CPU 702 loads a program stored in the recording portion 716 into the RAM 706 via the input-output interface 710 and the bus 708, and then executes a program configured to provide the functionality of the one or a combination of the functions described herein with respect the reception apparatus 20 and/or the service distribution apparatus.

The hardware description above, exemplified by any one of the structure examples shown in FIGS. 26 and 7, constitutes or includes specialized corresponding structure that is programmed or configured to perform the algorithm describe above, for example with reference to FIGS. 3-6. For example, any one or a combination of the algorithms shown in FIGS. 3-5 may be completely performed by the circuitry included in the single device shown in FIG. 2.

A system that includes the features in the foregoing description provides numerous advantages. In particular, the methodologies described herein may be employed to transport and acquire DRM-related information for DRM capable reception apparatuses to access protected services without interfering with the operation of non-DRM capable reception apparatuses, or reception apparatuses that do not support certain DRM systems.

Obviously, numerous modifications and variations are possible in light of the above teachings. It is therefore to be understood that within the scope of the appended claims, the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the present disclosure, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below.

(1) A reception apparatus, including receiver circuitry configured to receive a broadcast stream; and processing circuitry configured to extract, from the broadcast stream, a service list table (SLT) including service information for each of a plurality of services in the broadcast stream, determine whether the broadcast stream includes a digital rights management (DRM) service that is supported by the reception apparatus based on service category information in the service information for the plurality of services in the broadcast stream, and acquire DRM-related information, which is associated with the reception apparatus and delivered in the DRM service, based on a determination that the broadcast stream includes the DRM service that is supported by the reception apparatus.

(2) The reception apparatus according to feature (1), in which the processing circuitry is configured to when the broadcast stream is determined to include the DRM service that is supported by the reception apparatus, extract, from the broadcast stream, Service Layer Signaling (SLS) associated with the DRM service based on broadcast signaling related information included in the service information for the DRM service; and acquire the DRM-related information from a Layered Coding Transport (LCT) channel in the broadcast stream based on the extracted SLS.

(3) The reception apparatus according to feature (2), in which the processing circuitry is configured to acquire a DRM-related information file from the LCT channel that is associated with a transport object indicator (TOI) that matches a predetermined number of least-significant bits of a unique identifier of the reception apparatus.

(4) The reception apparatus according to any of features (1) to (3), in which the processing circuitry is configured to filter DRM-related information files delivered in a Layered Coding Transport (LCT) channel in the broadcast stream based on header fields delivered with the DRM-related information files; and acquire the filtered DRM-related information.

(5) The reception apparatus according to any of features (1) to (4), in which the service information for the DRM service includes DRM system identification information, and the processing circuitry is configured to determine whether the broadcast stream includes the DRM service that is supported by the reception apparatus based on the service category information and the DRM system identification information included in the service information.

(6) The reception apparatus according to any of features (1) to (5), in which the DRM system identification information is identified as a short service name or a global service identifier of the DRM service in the SLT.

(7) The reception apparatus according to any of features (1) to (6), in which the plurality of services includes a linear A/V service, and the processing circuitry is configured to decrypt the linear A/V service or at least one component of the linear A/V service using the acquired DRM-related information.

(8) The reception apparatus according to any of features (1) to (7), in which the DRM-related information is associated with a unique identifier of the reception apparatus.

(9) The reception apparatus according to feature (8), in which the processing circuitry is configured to determine a distribution window for the DRM service based on scheduling information included in the broadcast stream, and determine a time to begin monitoring the DRM service based on the determined distribution window and the unique identifier of the reception apparatus.

(10) A method of a reception apparatus for acquiring digital rights management (DRM)-related information, the method including receiving a broadcast stream; extracting, from the broadcast stream, a service list table (SLT) including service information for each of a plurality of services in the broadcast stream; determining, by processing circuitry of the reception apparatus, whether the broadcast stream includes a DRM service that is supported by the reception apparatus based on service category information in the service information for the plurality of services in the broadcast stream, and acquiring the DRM-related information, which is associated with the reception apparatus and delivered in the DRM service, based on a determination in the determining that the broadcast stream includes the DRM service that is supported by the reception apparatus.

(11) The method according to feature (10), in which the acquiring the DRM-related information includes extracting, from the broadcast stream, Service Layer Signaling (SLS) associated with the DRM service based on broadcast signaling related information included in the service information for the DRM service; and acquiring the DRM-related information from a Layered Coding Transport (LCT) channel in the broadcast stream based on the extracted SLS.

(12) The method according to feature (11), in which the acquiring the DRM-related information from the LCT channel includes acquiring a DRM-related information file from the LCT channel that is associated with a transport object indicator (TOI) that matches a predetermined number of least-significant bits of a unique identifier of the reception apparatus.

(13) The method according to any of features (10) to (12), in which the acquiring the DRM-related information includes filtering DRM-related information files delivered in a Layered Coding Transport (LCT) channel in the broadcast stream based on header fields delivered with the DRM-related information files; and acquiring the DRM-related information based on a result of the filtering.

(14) The method according to any of features (10) to (13), in which the service information for the DRM service includes DRM system identification information, and the determining includes determining whether the broadcast stream includes the DRM service that is supported by the reception apparatus based on the service category information and the DRM system identification information included in the service information.

(15) The method according to any of features (10) to (14), in which the DRM system identification information is identified as a short service name or a global service identifier of the DRM service in the SLT.

(16) The method according to any of features (10) to (15), in which the plurality of services includes a linear A/V service, and the method further includes decrypting the linear A/V service or at least one component of the linear A/V service using the acquired DRM-related information.

(17) The method according to any of features (10) to (16), in which the DRM-related information is associated with a unique identifier of the reception apparatus.

(18) The method according to feature (17), further including determining a distribution window for the DRM service based on scheduling information included in the broadcast stream, and determining a time to begin monitoring the DRM service based on the determined distribution window and the unique identifier of the reception apparatus.

(19) A non-transitory computer-readable medium storing instructions which when executed by a computer cause the computer to perform a method of a reception apparatus for acquiring digital rights management (DRM)-related information, the method including receiving a broadcast stream; extracting, from the broadcast stream, a service list table (SLT) including service information for each of a plurality of services in the broadcast stream; determining whether the broadcast stream includes a DRM service that is supported by the reception apparatus based on service category information in the service information for the plurality of services in the broadcast stream, and acquiring the DRM-related information, which is associated with the reception apparatus and delivered in the DRM service, based on a determination in the determining that the broadcast stream includes the DRM service that is supported by the reception apparatus.

(20) The non-transitory computer-readable medium according to feature (19), in which the acquiring the DRM-related information includes extracting, from the broadcast stream, Service Layer Signaling (SLS) associated with the DRM service based on broadcast signaling related information included in the service information for the DRM service; and acquiring the DRM-related information from a Layered Coding Transport (LCT) channel in the broadcast stream based on the extracted SLS.

(21) The non-transitory computer-readable medium according to feature (20), in which the acquiring the DRM-related information from the LCT channel includes acquiring a DRM-related information file from the LCT channel that is associated with a transport object indicator (TOI) that matches a predetermined number of least-significant bits of a unique identifier of the reception apparatus.

(22) The non-transitory computer-readable medium according to any of features (19) to (21), in which the acquiring the DRM-related information includes filtering DRM-related information files delivered in a Layered Coding Transport (LCT) channel in the broadcast stream based on header fields delivered with the DRM-related information files; and acquiring the DRM-related information based on a result of the filtering.

(23) The non-transitory computer-readable medium according to any of features (19) to (22), in which the service information for the DRM service includes DRM system identification information, and the determining includes determining whether the broadcast stream includes the DRM service that is supported by the reception apparatus based on the service category information and the DRM system identification information included in the service information.

(24) The non-transitory computer-readable medium according to any of features (19) to (23), in which the DRM system identification information is identified as a short service name or a global service identifier of the DRM service in the SLT.

(25) The non-transitory computer-readable medium according to any of features (19) to (24), in which the plurality of services includes a linear A/V service, and the method further includes decrypting the linear A/V service or at least one component of the linear A/V service using the acquired DRM-related information.

(26) The non-transitory computer-readable medium according to any of features (19) to (25), in which the DRM-related information is associated with a unique identifier of the reception apparatus.

(27) The non-transitory computer-readable medium according to feature (26), further including determining a distribution window for the DRM service based on scheduling information included in the broadcast stream, and determining a time to begin monitoring the DRM service based on the determined distribution window and the unique identifier of the reception apparatus.

(28) A service distribution system, including processing circuitry configured to generate a service list table (SLT) including service information for each of a plurality of services to be transmitted in a broadcast stream, each of the service information including category information for a respective one of the plurality of services; generate the broadcast stream including the SLT and the plurality of services for transmission; and deliver DRM-related information in a DRM service of the plurality of services in the broadcast stream, in which the service category information included in the SLT for the DRM service is DRM Service.

The invention claimed is:

1. A reception apparatus, comprising:
   receiver circuitry configured to receive a broadcast stream including a service list table (SLT) and a digital rights management (DRM) data service, the SLT including service information for the DRM data service; and
   processing circuitry configured to
      extract the service information for the DRM data service from the SLT included in the received broadcast stream, the service information for the DRM data service including a DRM system identifier, and
      acquire DRM information from the DRM data service when the DRM system identifier included in the service information, extracted from the SLT, for the DRM data service is determined to correspond to a DRM system that is supported by the reception apparatus.

2. The reception apparatus according to claim 1, wherein the processing circuitry is configured to
   determine that the DRM data service is included in the broadcast stream based on service category information included in the service information, and
   acquire the DRM information from the DRM data service when the DRM data service is determined to be included in the broadcast stream and the DRM system identifier included in the service information for the DRM data service corresponds to the DRM system that is supported by the reception apparatus.

3. The reception apparatus according to claim 1, wherein the processing circuitry is configured to
   extract, from the broadcast stream, service layer signaling (SLS) associated with the DRM data service based on broadcast signaling related information included in the service information for the DRM data service; and
   acquire the DRM information from a layered coding transport (LCT) channel in the broadcast stream based on the extracted SLS.

4. The reception apparatus according to claim 3, wherein the processing circuitry is configured to
   acquire a DRM information file from the LCT channel that is associated with a transport object indicator (TOI) that matches a predetermined number of least-significant bits of a unique identifier of the reception apparatus.

5. The reception apparatus according to claim 1, wherein the processing circuitry is configured to
   acquire one of a plurality of DRM information files delivered in a layered coding transport (LCT) channel in the broadcast stream based on header fields delivered with the DRM information files.

6. The reception apparatus according to claim 1, wherein the DRM system identifier indicates a universally unique identifier (UUID) of the DRM system.

7. The reception apparatus according to claim 1, wherein the broadcast stream includes a linear A/V service, and
   the processing circuitry is configured to process at least one component of the linear A/V service using the acquired DRM information.

8. The reception apparatus according to claim 1, wherein the DRM information is associated with a unique identifier of the reception apparatus.

9. A television, comprising:
   a display; and
   the reception apparatus according to claim 1.

10. A method of a reception apparatus for acquiring digital rights management (DRM) information, the method comprising:
   receiving a broadcast stream including a service list table (SLT) and a digital rights management (DRM) data service, the SLT including service information for the DRM data service;
   extracting, by processing circuitry of the reception apparatus, the service information for the DRM data service from the SLT included in the received broadcast stream, the service information for the DRM data service including a DRM system identifier, and
   acquiring, by the processing circuitry, DRM information from the DRM data service when the DRM system identifier included in the service information, extracted from the SLT, for the DRM data service is determined to correspond to a DRM system that is supported by the reception apparatus.

11. The method according to claim 10, further comprising:
   determining that the DRM data service is included in the broadcast stream based on service category information included in the service information, wherein
   the acquiring includes acquiring the DRM information from the DRM data service when the DRM data service is determined to be included in the broadcast stream and the DRM system identifier included in the service information for the DRM data service corresponds to the DRM system that is supported by the reception apparatus.

12. The method according to claim 10, wherein the acquiring comprises:
   extracting, from the broadcast stream, service layer signaling (SLS) associated with the DRM data service based on broadcast signaling related information included in the service information for the DRM data service; and
   acquiring the DRM information from a layered coding transport (LCT) channel in the broadcast stream based on the extracted SLS.

13. The method according to claim 10, wherein the acquiring comprises:
   acquiring a DRM information file from the LCT channel that is associated with a transport object indicator (TOI) that matches a predetermined number of least-significant bits of a unique identifier of the reception apparatus.

14. The method according to claim 10, wherein the acquiring comprises:
   acquiring one of a plurality of DRM information files delivered in a layered coding transport (LCT) channel in the broadcast stream based on header fields delivered with the DRM information files.

15. The method according to claim 10, wherein the DRM system identifier indicates a universally unique identifier (UUID) of the DRM system.

16. The method according to claim 10, wherein
   the broadcast stream includes a linear A/V service, and
   the method further includes processing at least one component of the linear A/V service using the acquired DRM information.

17. The method according to claim 10, wherein the DRM information is associated with a unique identifier of the reception apparatus.

18. A non-transitory computer-readable medium storing instructions which when executed by a computer cause the computer to perform a method of a reception apparatus for acquiring digital rights management (DRM), the method comprising:

receiving a broadcast stream including a service list table (SLT) and a digital rights management (DRM) data service, the SLT including service information for the DRM data service;

extracting the service information for the DRM data service from the SLT included in the received broadcast stream, the service information for the DRM data service including a DRM system identifier, and acquiring DRM information from the DRM data service when the DRM system identifier included in the service information, extracted from the SLT, for the DRM data service is determined to correspond to a DRM system that is supported by the reception apparatus.

19. The reception apparatus according to claim 1, wherein the service information for the DRM data service including a service identifier, a major channel number, a minor channel number, and service category information.

\* \* \* \* \*